United States Patent
Chung et al.

(10) Patent No.: US 12,542,647 B2
(45) Date of Patent: Feb. 3, 2026

(54) APPARATUS AND METHOD FOR MULTI-PHASE CLOCK CALIBRATION IN HIGH-SPEED DATA COMMUNICATION SYSTEMS

(71) Applicant: Avago Technologies International Sales Pte. Limited, Singapore (SG)

(72) Inventors: SangHye Chung, Irvine, CA (US); Seong-Ho Lee, Aliso Viejo, CA (US); Anand Vasani, Irvine, CA (US); Hyung-Joon Jeon, Irvine, CA (US); Arvindh Iyer, Foothill Ranch, CA (US); Nitin Nidhi, San Diego, CA (US); Namik Kemal Kocaman, Irvine, CA (US); Yuanfang Li, Irvine, CA (US); Jun Won Jung, Irvine, CA (US); Chung-Jue Chen, Irvine, CA (US); Taehun Yoon, Irvine, CA (US); George Yu, Newark, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/784,432

(22) Filed: Jul. 25, 2024

(65) Prior Publication Data

US 2026/0031968 A1 Jan. 29, 2026

(51) Int. Cl.
*H04L 7/02* (2006.01)
*H03K 5/13* (2014.01)

(52) U.S. Cl.
CPC ............... *H04L 7/02* (2013.01); *H03K 5/13* (2013.01)

(58) Field of Classification Search
CPC .................................... H04L 7/02; H03K 5/13
(Continued)

(56) References Cited

U.S. PATENT DOCUMENTS 7,102,446 B1 * 9/2006 Lee ....................... H03L 7/093
331/DIG. 2
7,512,201 B2 * 3/2009 Kelly ..................... H04L 7/0091
375/354

(Continued)

OTHER PUBLICATIONS

Extended European Search Report for European Patent Application No. 25191349.7 dated Dec. 8, 2025; 11 pages.
(Continued)

*Primary Examiner* — Fitwi Y Hailegiorgis
(74) *Attorney, Agent, or Firm* — Quarles & Brady LLP

(57) ABSTRACT

An apparatus for multiphase clock calibration for a transmitter in data communication systems includes a phase interpolator (PI) configured to receive a clock signal and generate multiphase clock signals with adjustable duty cycles and in-phase quadrature control. The apparatus may include a pattern generator coupled to the PI and configured to generate a pattern output based on a data signal sampled by the multiphase clock signals. The apparatus also includes a delay-adjust module coupled to the PI and configured to measure timing differences between the edges of a reference clock and the pattern output with adjustable delays. A phase detector is coupled to the pattern generator and configured to detect a phase error between the pattern output and the reference clock. A calibration controller is configured to provide controls to the PI and the delay-adjust module for adjusting delays to the reference clock and the pattern output to calibrate the multiphase clock signals.

20 Claims, 7 Drawing Sheets

(58) Field of Classification Search
USPC .......................................................... 375/354
See application file for complete search history.

(56) References Cited

U.S. PATENT DOCUMENTS

2021/0367588 A1    11/2021  Lim et al.
2022/0407505 A1*   12/2022  Kuzmenka .......... H03F 3/45179

OTHER PUBLICATIONS

Chen Yinghao et al., "A 2-20 Gbps Clock and Data Recovery Based on Phase Interpolation and Delay Locked Loop", Circuits, Systems, and Signal Processing, Cambridge, MS, US, vol. 43, No. 1, Aug. 10, 2023 (Aug. 10, 2023), pp. 318-330, XP037950872, ISSN: 0278-081 X, DOI: 10.1007/S00034-023-02473-5 [retrieved on Aug. 10, 2023].

* cited by examiner

APPARATUS AND METHOD FOR MULTI-PHASE CLOCK CALIBRATION IN HIGH-SPEED DATA COMMUNICATION SYSTEMS

BACKGROUND OF THE INVENTION

A serializer is a component used in high-speed data communication systems to convert parallel data into a serial data stream for a transmitter to transmit data over a single channel, which minimizes the number of physical connections required and increases the efficiency of data transmission. In high-speed data communication, serializers are designed to handle very high data rates, often exceeding 100 Gbps. The primary challenge in these communication systems is maintaining data integrity and signal quality. To achieve this, serializers utilize advanced clocking schemes and sophisticated error correction techniques.

FIG. 1 depicts a high-speed serializer used in data communication systems. The serializer includes multiple stages of multiplexers for converting multiple parallel data inputs labeled from d0 to dN into a serial data stream. The initial stage involves multiplexers (MUXs) that select one of the parallel inputs at a time based on the clock signals. These MUXs are controlled by a high-frequency clock to ensure that data is selected and forwarded in the correct order. The selected data from the initial MUX stage is further processed by a 4:1 MUX. This stage reduces the number of data paths by selecting one out of four data lines, further streamlining the data for serialization. A predriver amplifies the serialized data signal before passing it to the driver stage. The driver then amplifies the signal to the required transmission level, ensuring it is strong enough to travel through the transmission medium without significant degradation. The final serialized data output is ready for transmission. This high-speed serial data stream, TX data out, is then sent to the receiving end of the communication system.

As the speed of serializers increases, the internal clocking scheme evolves to manage the timing requirements effectively. Initially, full-rate clocking schemes, which use a single-phase clock, were common. However, these systems faced limitations in power efficiency and speed. To overcome these challenges, the industry has moved to half-rate (two-phase clocks) and quarter-rate (four-phase clocks) clocking schemes. FIG. 1 also shows the signal quality of the TX data output using eye diagrams patterned with quarter-rate non-return to zero (NRZ) transmission signaling as well as quarter-rate pulse amplitude modulation 4 (PAM4) signaling. In NRZ, each bit of data is represented by either a high or low voltage level. The eye diagram illustrates the signal transitions and the opening (or eye) that indicates the timing margin and signal integrity. A wider eye opening signifies better signal integrity and timing margins. PAM4 uses four distinct amplitude levels to represent two bits of data per symbol, effectively doubling the data rate compared to NRZ. However, PAM4 is more susceptible to noise and requires more complex signal processing. The eye diagram for PAM4 shows multiple levels of signal transitions, and the eye openings are narrower compared to NRZ, indicating a higher sensitivity to timing and amplitude errors.

FIG. 2 illustrates and compares (a) half-rate clocking transmission and (b) quarter-rate clocking transmission. In half-rate clocking scheme, two-phase clocks (CK_I and CK_IB) are used. This approach effectively reduces the frequency of each clock phase by half, thus reducing power consumption and improving performance at higher speeds. For even higher speeds, quarter-rate clocking uses four phase clocks (CK_I, CK_IB, CK_Q, and CK_QB), as also illustrated. This method further reduces the clock frequency, allowing the serializer to achieve higher data rates with lower power consumption. In high-speed serializers, clock multiphase errors directly affect the quality of the transmitted signal. These multiphase errors can manifest as duty-cycle errors (DCE) and in-phase/quadrature (IQ) mismatch, both of which translate to even-odd jitter (EOJ) at transmitter outputs that are amplified through predriver and driver after the last MUX stage, degrading the signal integrity and reducing the eye-opening in the transmitted data.

DCE occurs when the clock signal's high and low periods are not equal, leading to timing mismatches. This imbalance can cause jitter and distort the transmitted data, reducing the overall performance of the communication system. FIG. 2(a) highlights the impact of DCE on the transmitted data (D0 to D3). To correct DCE, advanced calibration techniques are used to ensure that the clock signal maintains a 50% duty cycle, thus minimizing timing errors. IQ mismatch (IQM) occurs when there is a phase error between the in-phase (I) and quadrature (Q) components of the clock signals. IQM can lead to signal distortion and reduced data integrity. FIG. 2(b) shows how IQM affects the data (D0 to D7). Calibration techniques are implemented to adjust the phase relationship between the I and Q components, ensuring accurate timing and minimizing signal distortion. For example, EOJ can be detected and calibrated by connecting a calibration multi-bit ADC at the output of a transmitter to detect low-frequency tones from DCE and IQM using a band-pass filter. However, the band-pass filter occupies a large chip area due to the frequency tones and the accuracy of calibration is highly affected by the resolution of the calibration ADC. Improved multiphase clock calibration is desired for minimizing EOJ induced by multiphase clock errors which is modulated to data transitions to affect both horizontal and vertical eye opening at the transmitter output.

BRIEF DESCRIPTION OF THE DRAWINGS

A further understanding of the nature and advantages of particular embodiments may be realized by reference to the remaining portions of the specification and the drawings, in which reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
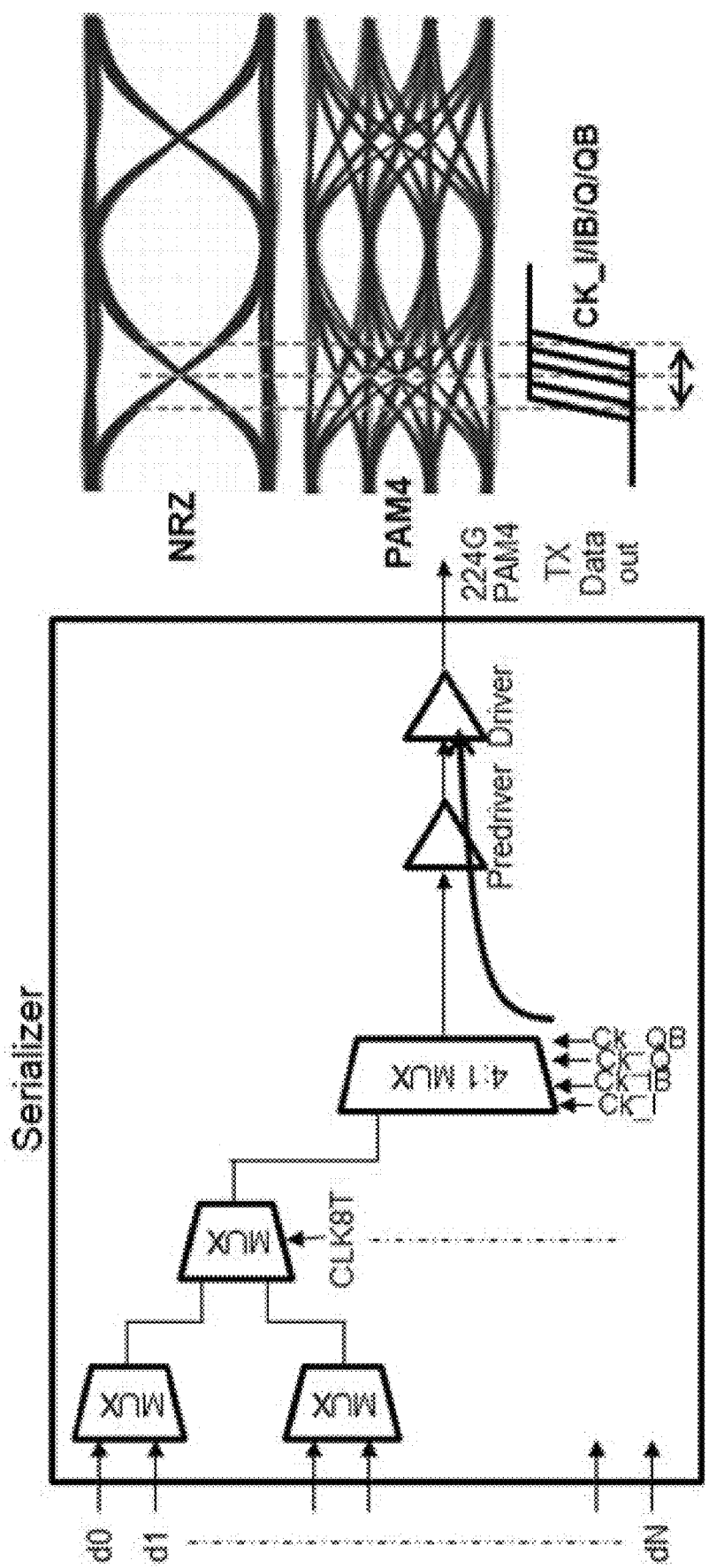
FIG. 1 shows a simplified diagram of a serializer in high-speed data communication systems and signal quality of transmission (TX) out with quarter-rate clocking.
Figure 2:
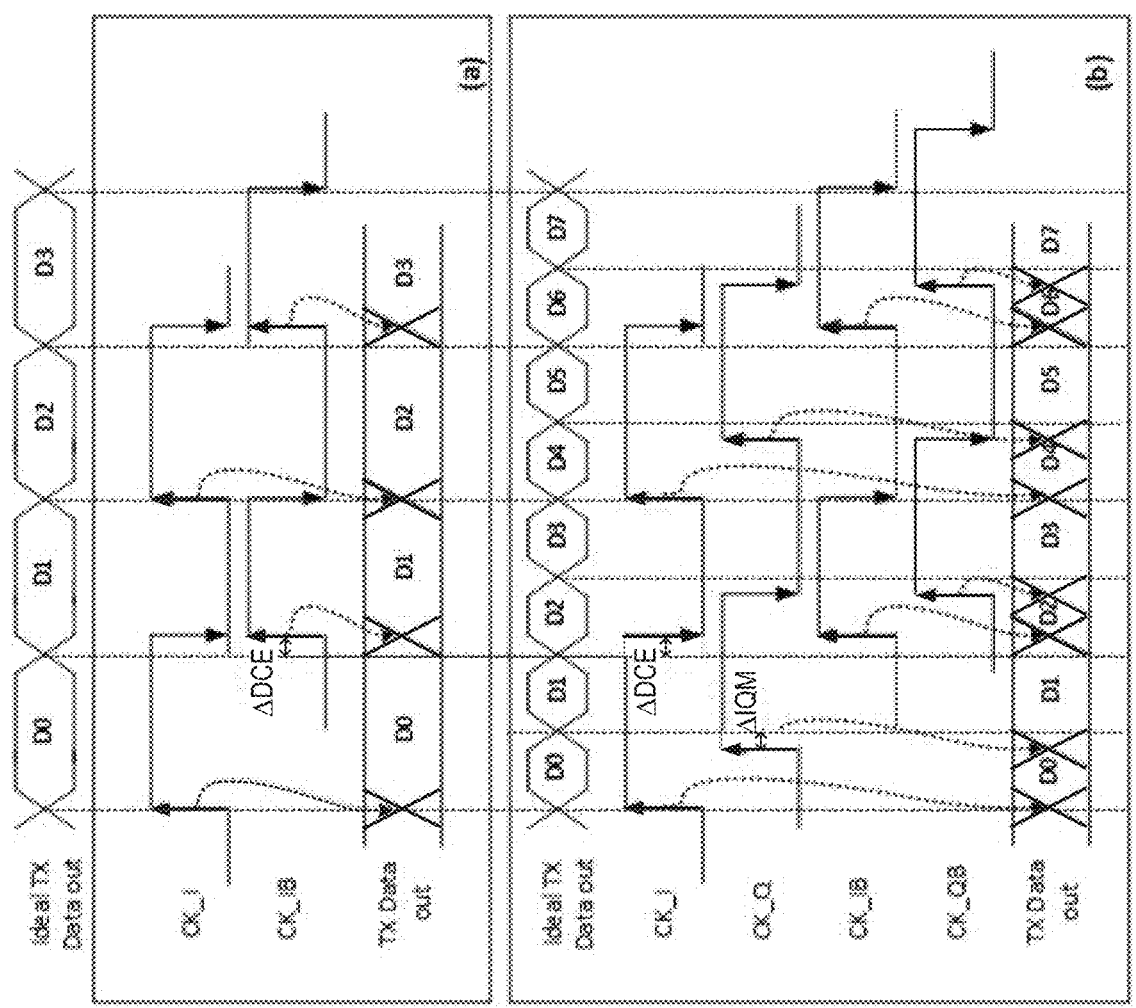
FIG. 2 shows a comparison of half-rate clocking transmission and quarter-rate clocking transmission impacted by multiphase clock errors including duty-cycle errors (DCE) and in-phase/quadrature (IQ) mismatch.

The subject technology provides an apparatus for multiphase clock calibration high-speed data communication systems. The apparatus may include a pattern generator configured to generate a pattern output based on a data signal sampled by multiphase clocks generated by a phase interpolator (PI) with adjustable duty cycles and in-phase quadrature control. The apparatus also includes a delay-adjust module coupled to the PI and configured to measure timing differences between the edges of a reference clock and the pattern output with adjustable delays. A calibration controller is configured to provide controls to the PI and the delay-adjust module for minimizing phase errors between the reference clock and the pattern output to calibrate the multiphase clocks. There are other embodiments as well.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Moreover, the terms left, right, front, back, top, bottom, forward, reverse, clockwise, and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and the use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require the selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect of the subject technology includes an apparatus for multiphase clock calibration in data communication systems. The apparatus includes a phase interpolator (PI) configured to receive a clock signal and generate multiphase clocks. The apparatus also includes a pattern generator coupled to the PI and configured to generate a pattern output based on a data signal sampled by the multiphase clocks with adjustable duty cycles and in-phase quadrature control. The apparatus also includes a delay-adjust module coupled to the PI and configured to measure timing differences between the edges of a reference clock and the pattern output with adjustable delays. The apparatus also includes a phase detector (PD) coupled to the pattern generator and configured to detect a phase error between the pattern output and the reference clock. The apparatus also includes a controller configured to provide controls to the PI and the delay-adjust module for adjusting phases of the reference clock and the pattern output to calibrate the multiphase clocks. As an example, the term "module" may refer to a hardware component, a software routine, or a combination of both, that is responsible for a particular task or operation. A module may include components such as processors, memory units, control circuits, interfaces, or software algorithms and routines.

Implementations may include one or more of the following features. The multiphase clocks may include clocks having more than two phases. The delay-adjust module may include one of the delay-adjustable circuits comprising switches or transmission gate arrays for delay adjustment, voltage-controlled delay elements, capacitor delay elements, resistor delay elements, a phase-locked loop, or a delay-locked loop. The PD may include one circuit that can distinguish phase differences of the clock signal, including a flip-flop circuit-based phase detector, an analog-to-digital converter-based phase detector, a phase frequency detector, an edge-triggered phase detector, a heterodyne phase detector, a time-to-digital converter-based phase detector, a multiplier-based phase detector, and a zero-crossing phase detector. The pattern generator is configured to generate the pattern output having one rising edge synchronized with a rising edge of an in-phase clock of the multiphase clocks and the next rising edge synchronized with a rising edge of an invert-phase clock of the multiphase clocks. The delay-adjust module is configured to measure a first timing difference between the rising edges of the reference clock and the pattern output and a second timing difference between the rising edges of the reference clock and the pattern output with a delay by half-cycle PI rotations and to perform an operation of subtracting the first timing difference from the second timing difference to extract duty-cycle errors of the multiphase clocks. The PD is configured to use ¾ of the maximum value of a PD output to detect the rising edge of the pattern output that is synchronized with the invert-phase clock and ¼ of the maximum value to detect the rising edge of the delayed pattern output that is synchronized with the in-phase clock. The delay-adjust module is configured to measure a first timing difference between the rising edges of the reference clock and the pattern output and a second timing difference between the rising edges of the reference clock and the pattern output with a two-bit shift plus a delay by half-cycle PI rotations and to perform an operation of subtracting the first timing difference from the second timing difference to extract duty-cycle errors of the multiphase clocks. The PD is configured to use ¾ of the maximum value of a PD output to detect the rising edge of the pattern output that is synchronized with the invert-phase clock and ½ of the maximum value to detect the rising edge of bit-shifted delayed pattern output that is synchronized with an invert quadrature-phase clock. The pattern generator is configured to generate the pattern output having one rising edge synchronized with a rising edge of an in-phase clock of the multiphase clocks and the next rising edge synchronized with a rising edge of a quadrature-phase clock of the multiphase clocks. The delay-adjust module is configured to measure a first timing difference between the rising edges of the reference clock and the pattern output and a second timing difference between the rising edges of the reference clock and the pattern output with a delay by quarter-cycle PI rotations and to perform an operation of subtracting the first timing difference from the second timing difference to extract an in-phase-quadrature-phase mismatch of the multiphase clocks. The delay-adjust module may include a high pass filter associated with the operation of subtracting the first timing difference from the second timing difference to filter out noises having frequencies lower than an inversed time spent between measuring the first timing difference and measuring the second timing difference. The delay-adjust module is configured to measure a first timing difference between the rising edges of the reference clock and the pattern output and a second timing difference between the rising edges of the reference clock and the pattern output with one-bit shift plus a delay by quarter-cycle phase interpolator rotations and to perform an operation of subtracting the first timing difference from the second timing difference to extract an in-phase-quadrature-phase mismatch of the multiphase clocks. The phase detector may include a low pass filter by averaging the detected phase errors sampled over time to filter out high-frequency noises based on a smoothy factor between 0 and 1.

Another general aspect of the subject technology includes a serializer with multiphase clock calibration in data transmission. The serializer also includes a clock input receiving a clock signal. The serializer also includes a data input configured to receive data signals. The serializer also includes multiplexers configured to convert data signals to serialized data. The serializer also includes output drivers configured to drive the serialized data to a transmission channel. The serializer also includes a phase interpolator configured to receive the clock signal and generate multiphase clocks. The serializer also includes a pattern generator coupled to the data input and the phase interpolator to generate a pattern output based on a data signal sampled by the multiphase clocks. The serializer also includes a delay-adjust module coupled to the phase interpolator and configured to measure timing differences between the edges of a reference clock and the pattern output with adjustable delays. The serializer also includes a phase detector coupled to the pattern generator and the transmitter output and is configured to detect a phase error between the pattern output and the reference clock. The serializer also includes a calibration engine interfaced with the phase interpolator, the phase detector, and the delay-adjust module to control the phase interpolator and the delay-adjust module to correct duty-cycle errors (DCE) and in-phase quadrature-phase mismatches (IQM) in the multiphase clocks by minimizing the phase error.

Implementations may include one or more of the following features. The pattern generator is configured to generate a first pattern output having one rising edge synchronized with a rising edge of an in-phase clock of the multiphase clocks and the next rising edge synchronized with a rising edge of an invert-phase clock of the multiphase clocks, and generate a second pattern output having one rising edge synchronized with a rising edge of an in-phase clock of the multiphase clocks and next rising edge synchronized with a rising edge of a quadrature-phase clock of the multiphase clocks. The delay-adjust module is configured to measure a first timing difference between the rising edges of the reference clock and the first/second pattern output and a second timing difference between the rising edges of the reference clock and the first/second pattern output with an added delay of rotating the phase interpolator by half-cycle/quarter-cycle rotations and to perform an operation of subtracting the first timing difference from the second timing difference to extract DCE/IQM of the multiphase clocks. The delay-adjust module is configured to measure a first timing difference between the rising edges of the reference clock and the first/second pattern output and a second timing difference between the rising edges of the reference clock and the first/second pattern output with 2-bit/1-bit shift plus an added delay of rotating the phase interpolator by half-cycle/quarter-cycle rotations and to perform an operation of subtracting the first timing difference from the second timing difference to extract DCE/IQM of the multiphase clocks. The serializer may include a control block coupled to the phase interpolator and the multiplexers, and configured to calibrate the multiphase clocks using DCE/IQM corrections before allowing the multiphase clocks to be used by the multiplexers.

A general aspect includes a method for multiphase clock calibration. The method also includes receiving a clock signal to generate multiphase clocks with adjustable duty cycles and in-phase quadrature control. The method also includes generating a pattern output based on a data signal sampled by the multiphase clocks. The method also includes measuring timing differences between the edges of a reference clock and the pattern output with adjustable delays. The method also includes detecting a phase error between the pattern output and the reference clock. The method also includes adjusting phases of the multiphase clocks to correct duty-cycle errors and in-phase-quadrature mismatches by minimizing the phase error.

Figure 3:
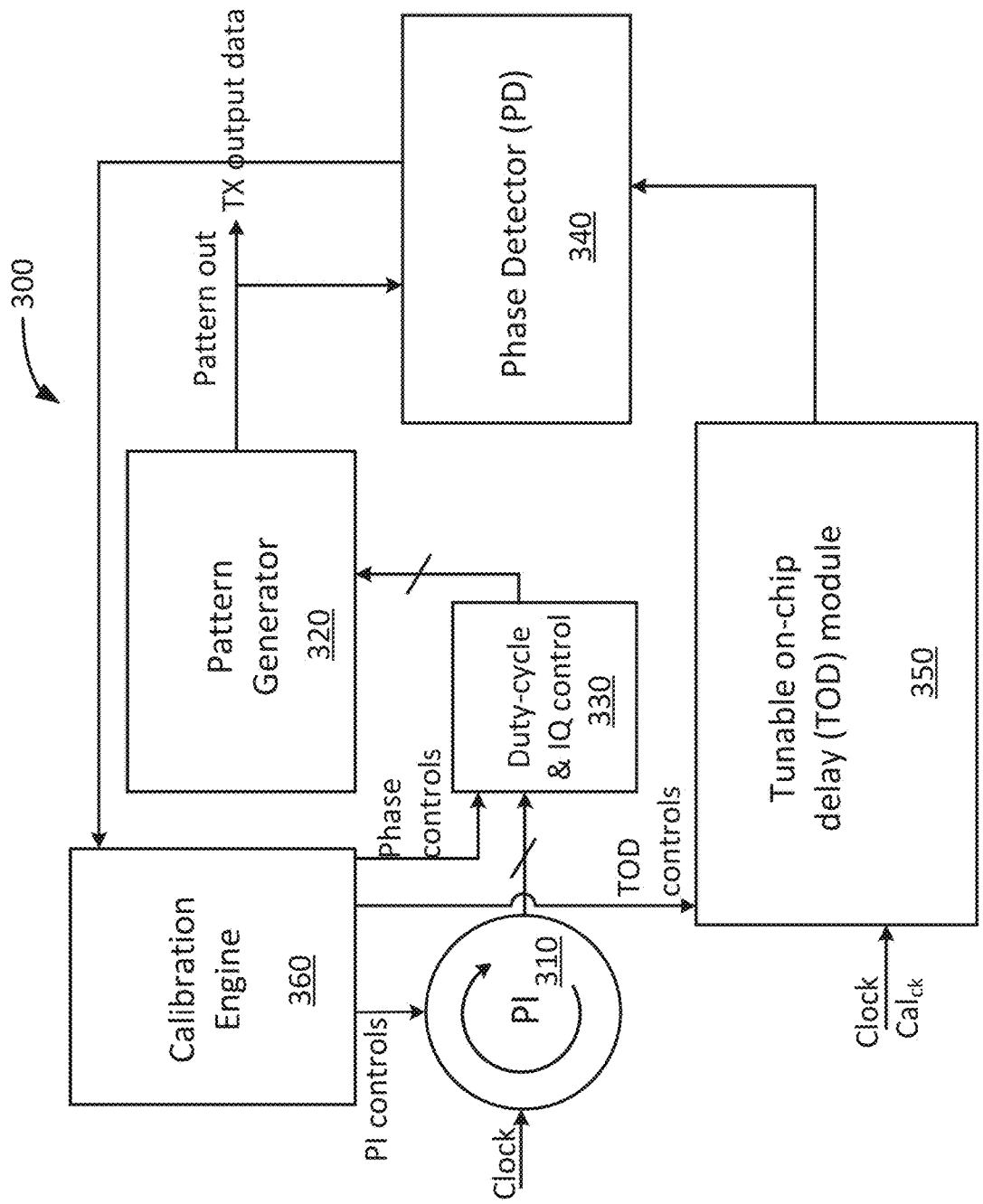
FIG. 3 is a block diagram of a system for calibrating multiphase clocks in high-speed serializers according to an embodiment of the subject technology.

FIG. 3 is a block diagram of a system for calibrating multiphase clocks in high-speed serializers according to an embodiment of the subject technology. This diagram is merely an example, which should not unduly limit the scope of the claims. One of ordinary skill in the art would recognize many variations, alternatives, and modifications. In an embodiment, system 300 is provided for calibrating multiphase clocks and multiphase clock signals in a high-speed serializer. Multiphase clock signals refers to a set of clock signals that are generated with specific, evenly spaced phase differences relative to each other. These signals are used in high-speed data communication systems to manage timing and synchronization of data transmission processes. Unlike a single-phase clock, which operates at a single frequency and phase, multiphase clock signals provide multiple timing references that allow for more precise control of data sampling, multiplexing, and other time-sensitive operations. For example, system 300 is implemented in a transmission path associated with a last multiplexer of the serializer which handles the multiphase clocks, for example, quarter-rate clocks for PAM4 modulation. Optionally, it can be implemented with a redundant calibration path in parallel to the real transmission path. The system and the multiphase clock calibration functions are applicable to any high-speed serializer and transmitting systems requiring low clock phase errors and the multiphase clocks can be any clocks having more than two phases. This system ensures accurate clock phase alignment for maintaining signal integrity in high-speed data communication.

Referring to FIG. 3, system 300 includes a phase interpolator (PI) 310 configured to receive a clock signal and generate multiphase clock signals with adjustable duty cycles and in-phase quadrature (IQ) control via a duty-cycle&IQ control block 330. For example, a PI is an electronic component that receives one or more reference clock signals and generates multiple clock phases with adjustable timing characteristics. By interpolating between the phases of the reference clock signals, the PI may provide clock signals at various intermediate phases, which can be controlled to achieve desired timing relationships. PI 310 may receive two or more reference clock signals (e.g., CLK0 and CLK90) that are 90 degrees out of phase with each other. These reference clocks are often derived from a higher-frequency clock source. PI 310 interpolates between these reference clock signals to create a new clock signal at an intermediate phase. This is done by adjusting the relative weights of the reference clocks based on phase controls. Phase controls dictate the exact weight or proportion of each reference clock signal used in the interpolation process. By adjusting these control signals, the PI can generate clock signals at any desired phase between the reference clocks. For instance, to create a clock signal at 45 degrees, the PI would blend CLK0 and CLK90 equally. The duty cycle of a clock signal is the ratio of its high period to its total period. Ideally, this should be 50%, but imperfections in clock generation can cause deviations. IQ control is essential for correcting phase mismatches between in-phase (I) and quadrature (Q) signals, which should ideally be 90 degrees apart.

Duty-cycle&IQ control block 330 adjusts the duty cycle and corrects any in-phase/quadrature (IQ) mismatches in multiphase clocks. Optionally, the multiphase clocks referred to here can be any clocks having more than 2 phases. The multiphase clocks then will be used by a pattern generator 320 for producing a known pattern output which in turn will be used for calibration of the multiphase clocks, ensuring that the generated pattern output maintains accurate timing. For example, a pattern generator refers to an electronic component that produces predefined sequences of digital signals, or patterns. These patterns are used to test, calibrate, and synchronize various components within high-speed communication systems. By generating specific data sequences, the pattern generator enables the analysis and adjustment of timing, phase alignment, and signal integrity. It ensures that the system components, such as serializers and multiplexers, operate correctly and efficiently. The generated patterns can simulate real data traffic, helping to detect and correct errors, optimize performance, and validate the functionality of the communication system. In various embodiments, the pattern output is designed for the multiphase clock calibration process, as it provides a signal that is sampled by the multiphase clocks and can be analyzed to detect and correct clock timing errors. Typical multiphase clock timing errors like DCE and IQM manifest to produce even-odd jitters (EOJ) to the data signals in the transmitter (TX) output. The pattern output sampled by the multiphase clocks also contains the information of EOJ. The generated pattern output is provided to the input of a phase detector (PD) 340 to calibrate phase errors coming from all sources. PD 340 compares the phases of the pattern output with a reference clock signal $Cal_{ck}$ (used for clock calibration) and detects any phase errors associated with both DCE and IQM between the data pattern and the reference clock. The detected phase errors are sent to a controller 360, e.g., calibration engine, for correction to complete the multiphase clock calibration process with duty-cycle and IQ control. Optionally, this process may be executed in real-time with feedback from the system through PD 340 and controller 360. The feedback allows PI 310 to dynamically adjust the phase control, duty cycle, and IQ settings. This real-time calibration ensures that the generated multiphase clocks remain accurate and stable, even in the presence of environmental variations and component aging.

The calibration engine, controller 360, is the central control unit that processes the phase error information received from the PD 340. It determines the necessary delay adjustment controls to correct the phase errors. Controller 360 interfaces with PI 310, duty-cycle&IQ control block 330, and a delay-adjust module 350 to send control signals to PI 310 and duty-cycle&IQ control block 330 to implement the required corrections. In particular, delay-adjust module 350 receives a reference clock signal $Cal_{ck}$, provides fine-grained control over the timing of the reference clock signal $Cal_{ck}$, and introduces precise delays to the data pattern to align the clock phases correctly based on the delay adjustment controls sent from the controller 360. In this way, delay-adjust module 350 can measure duty-cycle errors and IQ mismatches of the multiphase clocks.

In an embodiment, delay-adjust module 350 can be any delay-adjustable circuit. For example, delay-adjust module 350 may be a tunable on-chip delay (TOD) module including a plurality of voltage-controlled delay elements, a phase-locked loop, or a delay-locked loop. In another embodiment, delay-adjust module 350 may include transmission gate arrays with different paths of varying lengths. In yet another embodiment, delay-adjust module 350 may include switches and capacitors to create a delay line with delays being adjusted by changing the switching frequency or the capacitor values or a network of resistors and capacitors where the delay can be tuned by adjusting the resistor or capacitor values. For example, the term "delay-adjust" refers to a mechanism that is used to control and modify the timing of signals. By introducing adjustable delays, the delay-adjust mechanism can compensate for timing errors, phase mismatches, and other discrepancies that may arise in the system. Delay-adjust can be implemented using various technologies, including voltage-controlled delay elements, phase-locked loops, and digital delay lines.

In an embodiment, PD 340 may be provided as any circuit that can decide the phase difference between the pattern output signal and the reference clock signal $Cal_{ck}$. In some examples, PD 340 may be provided as one of the phase detectors, including a D flip-flop circuit-based phase detector, an analog-to-digital converter-based phase detector, a phase frequency detector, an XOR gate, an edge-triggered phase detector, a heterodyne phase detector, a time-to-digital converter-based phase detector, a multiplier-based phase detector, and a zero-crossing phase detector. As an example, a phase detector refers an electronic circuit that measures the difference in phase between two or more signals. By comparing the phases of a reference clock signal and a data signal or another clock signal, the phase detector identifies phase discrepancies and produces an output that represents the magnitude and direction of the phase difference. This information is then used to adjust the timing of the signals to achieve precise synchronization and alignment.

Figure 4:
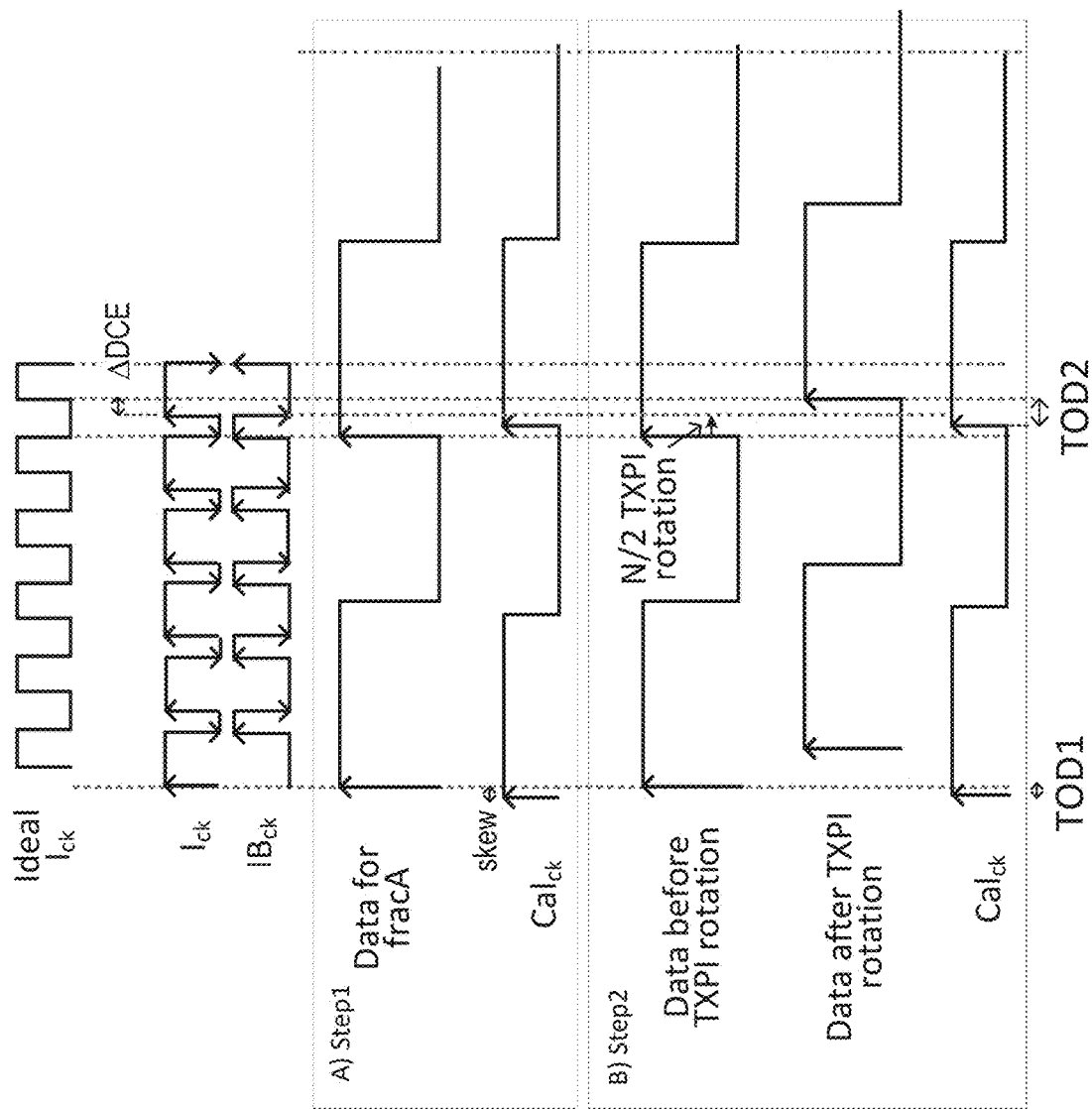
FIG. 4 is an example of data pattern output used for detecting even-odd jitter (EOJ) associated with duty-cycle error (DCE) using the system in FIG. 3 in a two-step process according to an embodiment of the subject technology.

FIG. 4 is an example of data pattern output used for detecting even-odd jitter (EOJ) associated with duty-cycle error (DCE) using the system in FIG. 3 in a two-step process according to an embodiment of the subject technology. This diagram is merely an example, which should not unduly limit the scope of the claims. One of ordinary skill in the art would recognize many variations, alternatives, and modifications. In an embodiment, the detection of DCE of the multiphase clocks includes a two-step process. As shown in FIG. 4, the ideal clock represents the reference timing for the system, with a perfect 50% duty cycle. $I_{ck}$ (In-phase clock) and $IB_{ck}$ (Invert-phase clock) are two multiphase clock signals that are 180 degrees out of phase with each other. The DCE, i.e., a duty-cycle error of the multiphase clocks, can be represented by the phase difference between the rising edge of $I_{ck}$ (or falling edge of $IB_{ck}$) and the corresponding edge of ideal clock $I_{ck}$, as indicated by ΔDCE in FIG. 4. Before the two-step process, the data pattern output generated by the pattern generator 320 is synchronized with edges of the multiphase clocks. For example, the first rising edge of the data signal (i.e., pattern output generated by such a pattern generator 320 in FIG. 3) is synchronized with a rising edge of one of the multiple phase clocks, $I_{ck}$, while the next rising edge of the data signal is synchronized with a rising edge of another multiphase clock $IB_{ck}$. In step 1 shown in FIG. 4, the pattern output, represented by Data for fracA, is generated based on exemplary data 1111000111110000 (4'1 3'0 5'1 4'0). A first timing difference, represented by TOD1 in FIG. 4, between the edges of the pattern output and the reference clock can be measured in step 1 by a delay-adjustable circuit (such as the delay module or a tunable on-chip delay (TOD) shown in FIG. 3).

In step 2, the pattern output (data) is adjusted in phase through the phase interpolator to perform a half-cycle rotation (or an N/2 rotation, provided N is a total number of PI rotation steps) to adjust the phase of the multiphase clocks. This rotation helps in detecting duty-cycle errors by shifting the phase by 180 degrees. Data before PI rotation at the top part of step 2 is aligned to the rising edges of $IB_{ck}$, like the data signal in step 1. After the half PI rotation, the data signals are sampled again to check for alignment. New misalignment is found, indicated by a shifted edge of the pattern output contributed by both the skew in reference clock signal $Cal_{ck}$ and the DCE in multiphase clocks. Thus, a second timing difference, represented by TOD2 in FIG. 4, between the pattern output after the half-cycle PI rotation and the reference clock can be measured in step 2 by the delay-adjustable circuit (TOD module 350). A consistent skew before and after the PI rotation would indicate no duty-cycle error, while a difference would highlight the presence and extent of the DCE. As a result, the magnitude of ΔDCE associated with the multiphase clocks can be extracted by subtracting the first timing difference TOD1 from the second timing difference TOD2 to remove the common skew of the reference clock.

In an embodiment, the potential non-linearity of the PI rotation process can be removed by repeating the above two-step process two times with different starting PI codes to obtain different ΔDCE values and averaging them to obtain a final ΔDCE. PI code n can be defined as an integer for giving a phase rotation of 2nπ/N, where n can be selected from 0, 1, . . . , N−1. For example, a first ΔDCE value may be obtained by repeating step 1 with an initial PI code X and repeating step 2 with a PI code of X+N/2, then subtracting the step 1 result from the step 2 result. A second ΔDCE value can be obtained by repeating step 1 with an initial PI code X+N/2 and repeating step 2 with a PI code of X+N, then subtracting the step 1 result from the step 2 result. A final ΔDCE value can be obtained by averaging the first ΔDCE value and the second ΔDCE value, eliminating the non-linearity issue of PI.

In an alternative embodiment, instead of using a fixed data pattern synchronized with both edges of in-phase clock $I_{ck}$ and invert-phase clock $IB_{ck}$, DCE can also be detected by generating a data pattern synchronized with only one edge of either $I_{ck}$ or $IB_{ck}$. For example, the pattern out can be set with one edge of data synchronized with a rising edge of $I_{ck}$ while the next edge of data is synchronized with a rising edge of $IB_{ck}$. The pattern output (e.g., 1111000011110000 (4'1 4'0 4'1 4'0) can be generated from the data pattern generator (320 in FIG. 3) typically located in a low-speed digital side. In step 1, a rising edge of the pattern output is synchronized with a rising edge of $I_{ck}$. While TOD1, a first timing difference between the edges of the pattern output and the reference clock can be measured by the delay-adjust module 350 in FIG. 3. In step 2, a bit-shifting operation can be done by the pattern generator to send a bit-shifted pattern output, e.g., 0011110000111100 with a two-bit shift from original pattern output 1111000011110000. The data edge is now synchronized with the quarter-phase clock $Q_{ck}$. Then, the pattern output is further adjusted in phase through the phase interpolator (310 in FIG. 3) to perform a half-cycle rotation. A second timing difference TOD2, between the edges of this bit-shifted delayed pattern output and the reference clock can be measured by the delay-adjust module. As a result, the magnitude of duty-cycle errors associated with the multiphase clocks can be extracted by subtracting the first timing difference TOD1 from the second timing difference TOD2. In step 2, the data after half-cycle PI rotation has its edge synchronized with $QB_{ck}$. When compared to the reference clock, a threshold is set to ½ of a maximum PD output.

Figure 5:
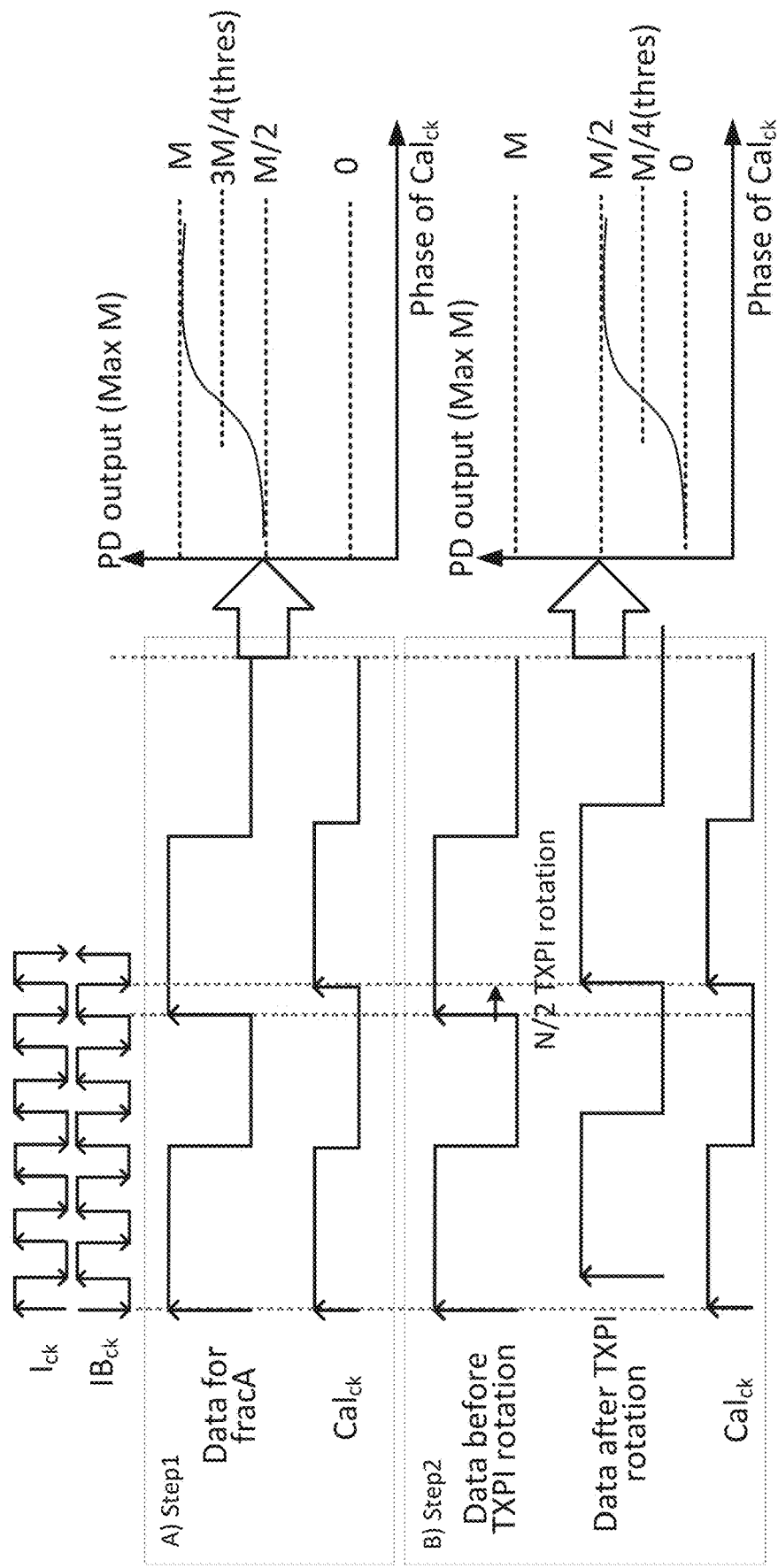
FIG. 5 is an example of phase detection based on the data pattern output used for duty-cycle error (DCE) detection in the two-step process according to an embodiment of the subject technology.

FIG. 5 is an example of phase detection based on the data pattern output used for duty-cycle error (DCE) detection in the two-step process according to an embodiment of the subject technology. This diagram is merely an example, which should not unduly limit the scope of the claims. One of ordinary skill in the art would recognize many variations, alternatives, and modifications. Checking the alignment of the pattern output with the reference clock needs to detect the edges of the signals. Phase detector 340 can be configured to conduct these detections with no confusion by setting a proper threshold value relative to the maximum output value of the phase detector. The thresholds are set to ensure reliable detection of data edges despite any phase noise, jitter, or other imperfections. The different thresholds account for the changes in the PD output caused by the half-cycle rotation. The PD output represents the phase difference detected between two signals, which has a minimum 0 and a maximum M. Depending on different scenarios, the actual output may be closer to 0 or closer to M.

FIG. 5 shows, in step 1 for detecting DCE of multiphase clocks, the data for fracA represents the pattern output with its edge synchronized with $IB_{ck}$ (which is 180 degrees out-of-phase relative to in-phase clock). When the edge of the pattern output is compared with the edge of the reference clock (assumed to be aligned with the ideal clock $I_{ck}$), the phase difference is closer to M. Thus, a threshold in step 1 is set to 3M/4, ensuring that only significant phase differences (indicative of substantial timing errors or duty-cycle errors) are detected. If the phase difference is significant, the PD output will surpass the threshold 3M/4, indicating a potential timing error that needs correction. In step 2, the data after half-cycle PI rotation has its edge synchronized with $I_{ck}$. When compared to the reference clock, the phase difference is closer to 0. Thus, a threshold in step 2 is set to a lower value of M/4. After the PI rotation, the PD output corresponding to smaller phase differences will still be detectable because the threshold is set lower.

Figure 6:
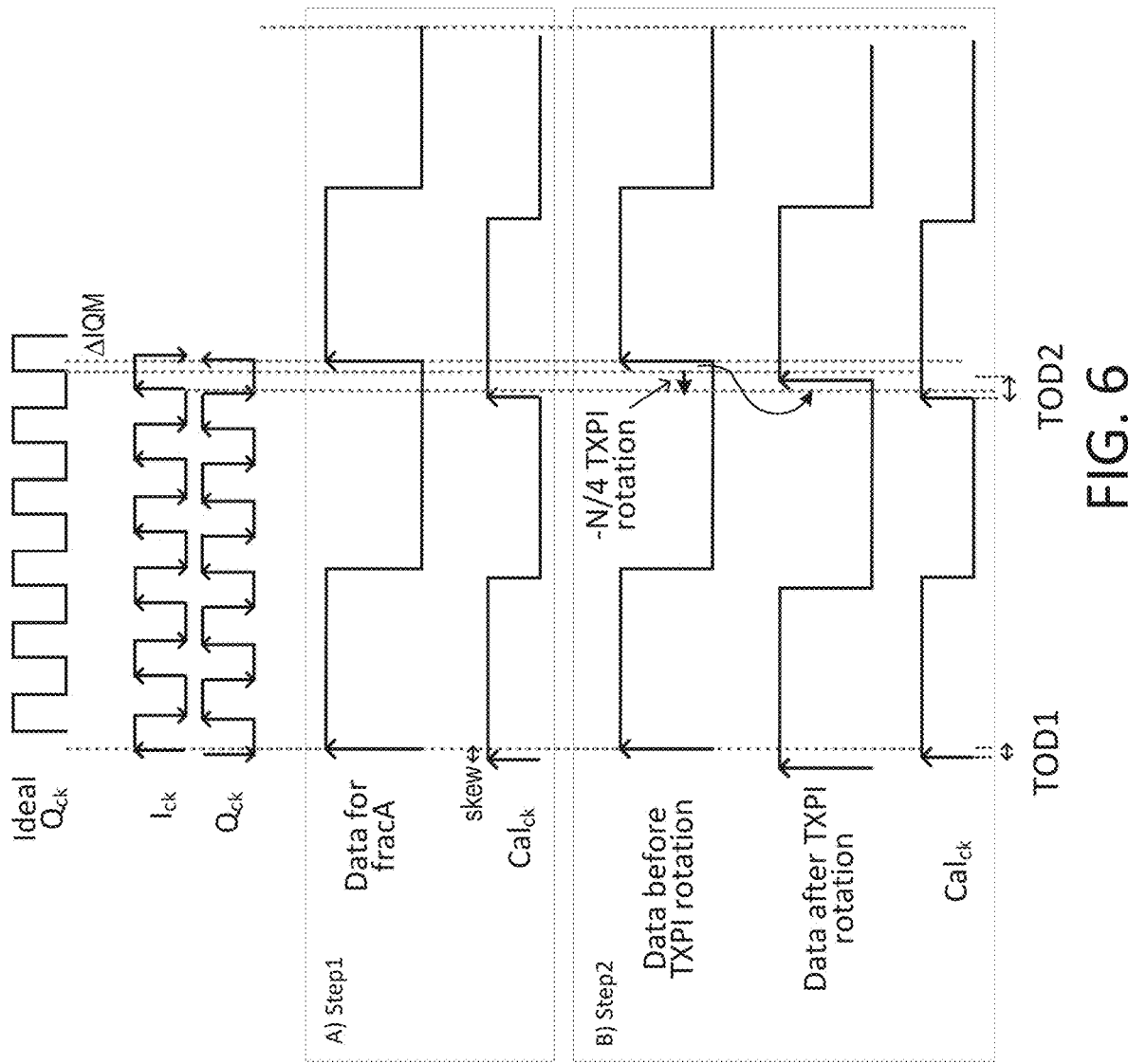
FIG. 6 is an example of data pattern output used for detecting even-odd jitter (EOJ) associated with IQ mismatch (IQM) using the system in FIG. 3 in a two-step process according to an embodiment of the subject technology.

FIG. 6 is an example of data pattern output used for detecting even-odd jitter (EOJ) associated with IQ mismatch (IQM) using the system in FIG. 3 in a two-step process according to an embodiment of the subject technology. This diagram is merely an example, which should not unduly limit the scope of the claims. One of ordinary skill in the art would recognize many variations, alternatives, and modifications. FIG. 6 illustrates the detection of IQM by measuring the timing difference between the edges of the calibration clock ($Cal_{ck}$) and the data signal aligned with the quadrature clock ($Q_{ck}$). The detection process involves two steps: aligning the data with $Q_{ck}$ and then performing a quarter-phase interpolation (PI) rotation. In order to detect EOJ induced by IQM, the pattern output of the pattern generator can be reset like the example shown in FIG. 6. In the example, one edge of the pattern output is synchronized with a rising edge of in-phase clock $I_{ck}$ of the multiphase clocks while another edge is synchronized with a rising edge of quadrature-phase clock $Q_{ck}$, a 90 degrees out-of-phase relative to $I_{ck}$. IQM refers to the phase mismatch between the in-phase ($I_{ck}$) and quadrature-phase ($Q_{ck}$) components, which should ideally be 90 degrees apart. The IQM of the multiphase clocks can be represented by the phase difference between this $Q_{ck}$ and an ideal $Q_{ck}$, as indicated by ΔIQM in FIG. 6.

Referring to FIG. 6, IQM detection includes a two-step process. Step 1 is to measure the skew between the pattern output, denoted as Data for fracA, and the reference clock $Cal_{ck}$. A first timing difference, TOD1, between rising edges of the pattern output and the reference clock $Cal_{ck}$ can be measured by a delay-adjustable module (TOD module 350) to adjust the phases for aligning those edges based on controls from a calibration engine (controller 360) generated from phase difference detected by a phase detector (PD 340). The phase detector measures the phase difference between $Cal_{ck}$ and the data signal aligned with $Q_{ck}$.

In step 2, the pattern output (data) is adjusted in phase through the phase interpolator (PI 310) to perform a quarter-cycle rotation (or a N/4 rotation, provided N is a total number of PI rotation steps) to adjust the phase of the multiphase clocks. This rotation helps in detecting IQ mismatches by shifting the phase by 90 degrees. Data before PI rotation at the top part of step 2 is aligned to the rising edges of $Q_{ck}$, like the data signal in step 1. After the N/4 PI rotation, the data signals are sampled again to check for alignment. A misalignment, indicated by a shifted edge of the Data after N/4 PI rotation for fracB, is found in FIG. 6. This phase error is contributed by both the skew in reference clock signal $Cal_{ck}$ and the IQM in multiphase clocks. A second timing difference, represented by TOD2 in FIG. 4, between the pattern output after the quarter-cycle PI rotation and the calibration clock can also be measured in step 2 by the delay-adjustable circuit (TOD module 350). Any deviation between these measurements indicates an IQM, as the phase alignment with $Q_{ck}$ (before rotation) and the new alignment (after rotation) should ideally be consistent if there is no mismatch. As a result, the magnitude of in-phase/quadrature mismatch associated with the multiphase clocks can be extracted by subtracting the first timing difference TOD1 from the second timing difference TOD2.

In an alternative embodiment, instead of using a fixed data pattern synchronized with both edges of in-phase clock $I_{ck}$ and invert-phase clock $IB_{ck}$, IQM can also be detected by generating a data pattern synchronized with only one edge of either $I_{ck}$ or $IB_{ck}$. For example, the pattern out can be set with one edge of data synchronized with a rising edge of $I_{ck}$ while the next edge of data is synchronized with a rising edge of $Q_{ck}$. The pattern output (e.g., 1111000011110000 (4'1 4'0 4'1 4'0) can be generated from the data pattern generator (320 in FIG. 3) typically located in a low-speed digital side. In step 1, a rising edge of the pattern output is synchronized with a rising edge of $I_{ck}$. While TOD1, a first timing difference between the edges of the pattern output and the reference clock can be measured by the delay-adjust module 350 in FIG. 3. In step 2, a bit-shifting operation can be done by the pattern generator to send a bit-shifted pattern output, e.g., 0111100001111000 with a one-bit shift from original pattern output 1111000011110000. The data edge is now synchronized with the quarter-phase clock $Q_{ck}$. Then, the pattern output is further adjusted in phase through the phase interpolator (310 in FIG. 3) to perform a quarter-cycle rotation. A second timing difference TOD2, between the edges of this bit-shifted delayed pattern output and the reference clock can be measured by the delay-adjust module. As a result, the magnitude of duty-cycle errors associated with the multiphase clocks can be extracted by subtracting the first timing difference TOD1 from the second timing difference TOD2. In step 2, the data after quarter-cycle PI rotation has its edge synchronized with $IB_{ck}$. When compared to the reference clock, a threshold is set to ½ of a maximum PD output.

In another embodiment, the potential non-linearity of the PI rotation process can be removed by repeating the above two-step process four times with different starting PI codes to obtain different ΔIQM values and averaging them to obtain a final ΔIQM. For example, a first ΔIQM value may be obtained by repeating step 1 with an initial PI code X and repeating step 2 with a PI code of X+N/4, then subtracting the step 1 result from the step 2 result. A second ΔIQM value can be obtained by repeating step 1 with an initial PI code X+N/4 and repeating step 2 with a PI code of X+N/2, then subtracting the step 1 result from the step 2 result. A third ΔIQM value can be obtained by repeating step 1 with an initial PI code X+N/2 and repeating step 2 with a PI code of X+3N/4, then subtracting the step 1 result from the step 2 result. A fourth ΔIQM value can be obtained by repeating step 1 with an initial PI code X+3N/4 and repeating step 2 with a PI code of X, then subtracting the step 1 result from the step 2 result. A final ΔIQM value can be obtained by averaging the four ΔIQM values, eliminating the non-linearity issue of PI.

There is always noise modulated in the clocks used at the input of PD, which degrades the accuracy of detections. While driving up detection accuracy also increases calibration time. A trade-off between the detection accuracy and the calibration time is preferred. In some embodiments, the subject technology provides a system for minimizing noises modulated in the multiphase clocks to enhance the accuracy of EOJ detection while having a relatively fast calibration time. Optionally, system 300 may include a filter disposed at the output of PD 340 to filter out some noises in clocks. PD 340 may include a low pass filter based on an accumulator by averaging the detected phase errors sampled over time to filter out high-frequency noises based on a smoothy factor between 0 and 1. For example, by having an accumulator, a simple low-pass filter can be applied to filter out noises with frequencies higher than 10 GHZ. Optionally, system 300 may also include a high-pass filter configured with the calibration controller 360 and delay-adjust module (TOD module 350) used during the operation for conducting the subtraction of TOD2-TOD1. Noises having frequencies lower than 1/(time spent between TOD1 and TOD2 measurements) can be filtered out from the TOD2-TOD1 operation. In addition, the total residue noise after the filters can be reduced, from an average of −120 dB to about −140 dB, by averaging the detected EOJ (both DCE and IQM) values. Fast detection (less calibration time) can be achieved by having the number of averaging equal to $2^N$ (N is an integer) because this does not require any division operation to have a fractional value of EOJ. In an alternative embodiment, by implementing the calibration engine (controller 360) in hardware, calibration time can be reduced significantly. Reduced calibration time also allows for a better accuracy of detection.

Figure 7:
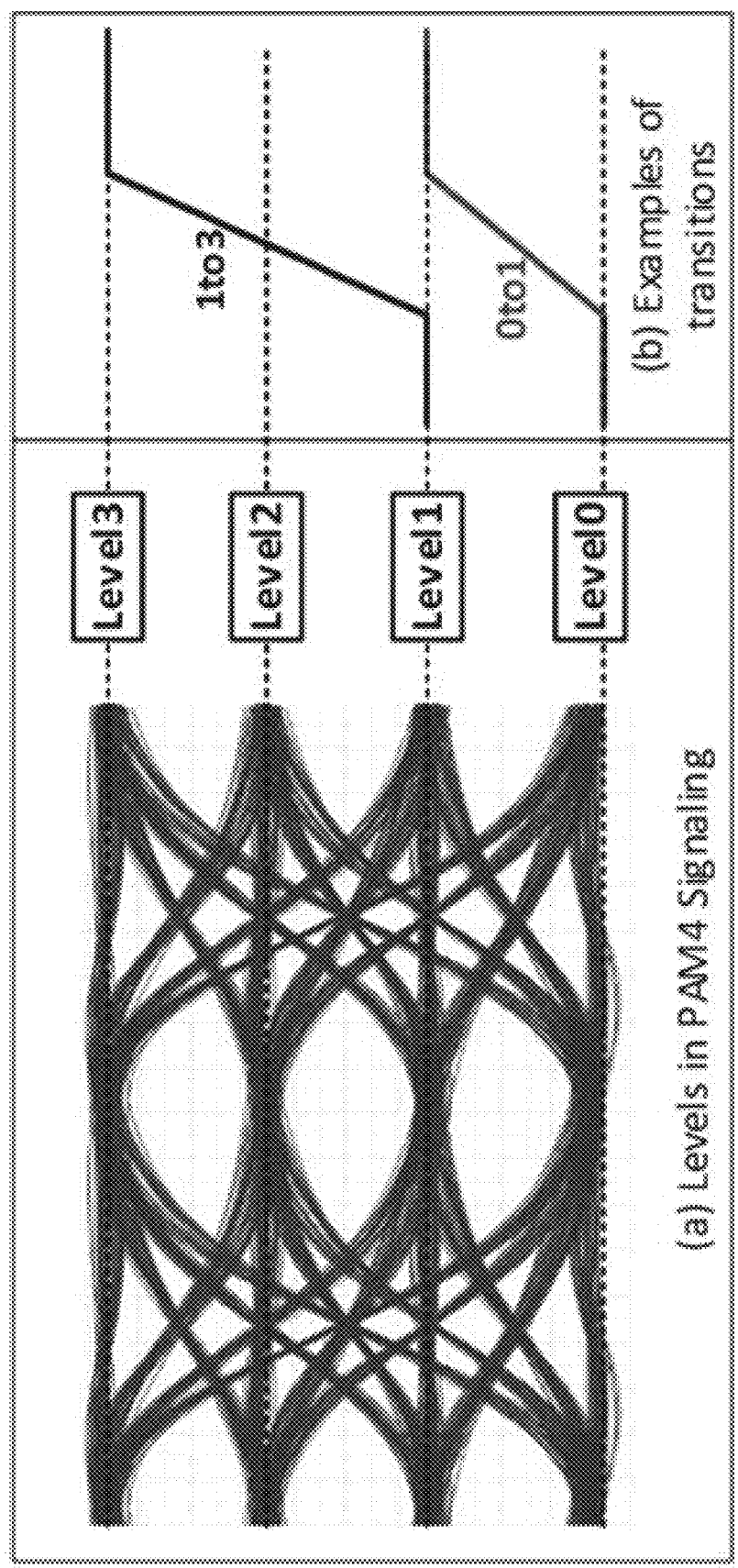
FIG. 7 depicts (a) levels and (b) exemplary transitions in PAM4 signaling in which EOJ values associated with respective transitions can be detected using the system in FIG. 3 according to an embodiment of the subject technology.

FIG. 7 depicts (a) levels and (b) exemplary transitions in PAM4 signaling in which EOJ values associated with respective transitions can be detected using the system in FIG. 3 according to an embodiment of the subject technology. This diagram is merely an example, which should not unduly limit the scope of the claims. One of ordinary skill in the art would recognize many variations, alternatives, and modifications. In multi-level signaling such as PAM4, there are various transitions. As an example, FIG. 7 illustrates the concept of 4-level PAM4 signaling, which is used in high-speed data communication systems to increase data throughput by encoding two bits per symbol. This modulation scheme introduces multiple signal levels and various transitions between these levels, which can lead to timing errors such as EOJ. The left part of the figure shows an eye diagram for PAM4 signaling. An eye diagram is a visual representation of the signal integrity and timing margins of a digital communication signal. PAM4 uses four distinct amplitude levels (Level0, Level1, Level2, Level3) to encode data, each level representing a different combination of two bits (00, 01, 10, 11). The right part of the figure shows examples of transitions between different PAM4 levels. For example, FIG. 7 shows a 1 to 3 transition from Level 1 to Level 3 and a 0 to 1 transition from Level 0 to Level 1. The eye diagram shows multiple eye openings, each corresponding to different transitions between the PAM4 levels. There is total 12 transitions between different signal levels: 0to1, 0to2, 0to3, 1to2, 1to3, 2to3, 1to0, 2to0, 3to0, 2to1, 3to1, and 3to2. The clarity and size of these openings indicate the signal integrity and timing margin. Overlapping eyes can indicate timing issues such as EOJ.

In an embodiment, each PAM4 transition can have a different EOJ value which can be detected by the system 300 proposed in FIG. 3 by using different data patterns generated from a pattern generator (320). For example, for the case of 1to3 transition, a fixed 1to3 pattern (see left part of FIG. 7) can be used as the pattern output in system 300. This transition involves a significant change in amplitude, which can be more susceptible to timing variations and jitter. Detecting EOJ for this transition involves measuring the timing difference between the ideal and actual edge crossings. EOJ can be detected when these openings start to blur or overlap, indicating that the edges of different transitions are not occurring at the expected times. In another example, a 0 to 1 transition, it involves a smaller change in amplitude, which might be less susceptible to jitter compared to larger transitions. However, it still requires careful timing analysis to detect EOJ. The phase detector (360) in system 300 can be used to measure the phase difference between the expected and actual edges of the transitions. System 300 can be configured to calibrate PAM4 signaling to minimize EOJ across all the level transitions. This involves adjusting the timing and phase of the signal generation and transmission circuits to ensure that the multi-level transitions occur as close to their ideal times as possible.

Though only a quarter-rate clocking scheme is used as an example to describe the subject technology for calibrating multiphase clocks in serializers, the system and method can be applied to extend to multiphase clocks with more than 4 phases. In another embodiment, the foreground EOJ calibration described in the subject technology can be done together with integral non-linearity (INL) calibration of the phase interpolator within the same system architecture shown in FIG. 3. Non-linearity errors can arise from various sources, including process variations, temperature changes, and component aging. By calibrating INL, the system compensates for these errors, enhancing the overall accuracy and performance.

System 300 contains basic blocks for INL calibration, including PI 310, PD 340, and TOD module 350, and allows the INL calibration to also be done together with the EOJ calibration proposed in the subject technology. Both phase errors before PI and after PI can be calibrated. EOJ calibration removes phase errors coming from stages after PI while INL calibration removes phase errors coming from stages before PI and errors generated from the PI itself.

Additional advantages of the subject technology may include using a smaller chip area as it does not use a low-frequency sinewave but uses a high-speed data pattern.

The PD 340 can be any circuit that can decide phase difference (e.g., a slicer, latch), which is smaller in area than the ADC component. Also, the sizes of buffers or MUXs or circuits in data and clock paths can be reduced because EOJ can be calibrated by the subject technology without increasing the sizes, resulting in lower power consumption. The method of multiphase clock calibration provided in the subject technology is self-contained without the need for external components. It is immune to skew between the calibration reference clock $Cal_{ck}$ and the data (pattern output) as well as immune to the non-linearity of the PI. A further advantage of the subject technology includes using this method to calibrate not only DCE and IQM coming from the clock path but also calibrate phase error coming from data paths such as MUXs/predriver/driver. Furthermore, the system of the subject technology can also be implemented for background EOJ calibration if it is implemented with a replica serializer.

While the above is a full description of the specific embodiments, various modifications, alternative constructions, and equivalents may be used. Therefore, the above description and illustrations should not be taken as limiting the scope of the present invention which is defined by the appended claims.

What is claimed is:

1. An apparatus for clock calibration, comprising:
   a phase interpolator (PI) configured to receive a clock signal and generate multiphase clock signals;
   a pattern generator coupled to the PI and configured to generate a pattern output based on a data signal sampled by the multiphase clock signals with adjustable duty cycles and in-phase quadrature control;
   a delay-adjust module coupled to the PI and configured to measure timing differences between edges of a reference clock and the pattern output with adjustable delays;
   a phase detector (PD) coupled to the pattern generator and configured to detect a phase error between the pattern output and the reference clock; and
   a controller configured to provide controls to the PI and the delay-adjust module for adjusting phases of the reference clock and the pattern output to calibrate the multiphase clock signals.

2. The apparatus of claim 1, wherein the multiphase clock signals comprise clock signals having more than two phases.

3. The apparatus of claim 1, wherein the delay-adjust module comprises one of delay adjustable circuits comprising switches or transmission gate arrays for delay adjustment, voltage-controlled delay elements, capacitor delay elements, resistor delay elements, a phase-locked loop, or a delay-locked loop.

4. The apparatus of claim 1, wherein the PD comprises a circuit that is configured to distinguish phase differences of the clock signal, including a flip-flop circuit-based phase detector, an analog-to-digital converter-based phase detector, a phase frequency detector, an edge-triggered phase detector, a heterodyne phase detector, a time-to-digital converter-based phase detector, a multiplier-based phase detector, and a zero-crossing phase detector.

5. The apparatus of claim 1, wherein the pattern generator is configured to generate the pattern output having a rising edge synchronized with a rising edge of an in-phase clock of the multiphase clock signals and the next rising edge synchronized with a rising edge of an invert-phase clock of the multiphase clock signals.

6. The apparatus of claim 5, wherein the delay-adjust module is configured to measure a first timing difference between the rising edges of the reference clock and the pattern output and a second timing difference between the rising edges of the reference clock and the pattern output with a delay by half-cycle PI rotations and to perform an operation of subtracting the first timing difference from the second timing difference to extract duty-cycle errors of the multiphase clock signals.

7. The apparatus of claim 6, wherein the PD is configured to use ¾ of the maximum value of a PD output to detect the rising edge of the pattern output that is synchronized with the invert-phase clock and ¼ of the maximum value to detect the rising edge of the delayed pattern output that is synchronized with the in-phase clock.

8. The apparatus of claim 7, wherein the delay-adjust module is configured to measure a first timing difference between the rising edges of the reference clock and the pattern output and a second timing difference between the rising edges of the reference clock and the pattern output with a two-bit shift plus a delay by half-cycle PI rotations and to perform an operation of subtracting the first timing difference from the second timing difference to extract duty-cycle errors of the multiphase clock signals.

9. The apparatus of claim 8, wherein the PD is configured to use ¾ of the maximum value of a PD output to detect the rising edge of the pattern output that is synchronized with the invert-phase clock and ½ of the maximum value to detect the rising edge of bit-shifted delayed pattern output that is synchronized with an invert quadrature-phase clock.

10. The apparatus of claim 1, wherein the pattern generator is configured to generate the pattern output having one rising edge synchronized with a rising edge of an in-phase clock of the multiphase clock signals and the next rising edge synchronized with a rising edge of a quadrature-phase clock of the multiphase clock signals.

11. The apparatus of claim 10, wherein the delay-adjust module is configured to measure a first timing difference between the rising edges of the reference clock and the pattern output and a second timing difference between the rising edges of the reference clock and the pattern output with a delay by quarter-cycle PI rotations and to perform an operation of subtracting the first timing difference from the second timing difference to extract an in-phase-quadrature-phase mismatch of the multiphase clock signals.

12. The apparatus of claim 10, wherein the delay-adjust module is configured to measure a first timing difference between the rising edges of the reference clock and the pattern output and a second timing difference between the rising edges of the reference clock and the pattern output with one-bit shift plus a delay by quarter-cycle PI rotations and to perform an operation of subtracting the first timing difference from the second timing difference to extract an in-phase-quadrature-phase mismatch of the multiphase clock signals.

13. The apparatus of claim 11, wherein the delay-adjust module comprises a high pass filter associated with the operation of subtracting the first timing difference from the second timing difference to filter out noises having frequencies lower than an inversed time spent between measuring the first timing difference and measuring the second timing difference.

14. The apparatus of claim 1, wherein the PD comprises a low pass filter by averaging the detected phase errors sampled over time to filter out high-frequency noises based on a smoothy factor between 0 and 1.

15. A serializer with multiphase clock calibration in a data transmission system comprising:
- a clock input receiving a clock signal;
- a data input configured to receive data signals;
- multiplexers configured to convert data signals to serialized data;
- output drivers configured to drive the serialized data to a transmission channel;
- a phase interpolator configured to receive the clock signal and generate multi-phase clocks;
- a pattern generator coupled to the data input and the phase interpolator to generate a pattern output based on a data signal sampled by the multiphase clock signals;
- a delay-adjust module coupled to the phase interpolator and configured to measure timing differences between edges of a reference clock and the pattern output with adjustable delays;
- a phase detector coupled to the pattern generator and the transmitter output, and configured to detect a phase error between the pattern output and the reference clock;
- a calibration engine interfaced with the phase interpolator, the phase detector, and the delay-adjust module to control the phase interpolator and the delay-adjust module to correct duty-cycle errors (DCE) and in-phase quadrature-phase mismatches (IQM) in the multiphase clock signals by minimizing the phase error.

16. The serializer of claim 15, wherein the pattern generator is configured to generate a first pattern output having one rising edge synchronized with a rising edge of an in-phase clock of the multiphase clock signals and the next rising edge synchronized with a rising edge of an invert-phase clock of the multiphase clock signals, and generate a second pattern output having one rising edge synchronized with a rising edge of an in-phase clock of the multiphase clock signals and next rising edge synchronized with a rising edge of a quadrature-phase clock of the multiphase clock signals.

17. The serializer of claim 16, wherein the delay-adjust module is configured to measure a first timing difference between the rising edges of the reference clock and the first/second pattern output and a second timing difference between the rising edges of the reference clock and the first/second pattern output with an added delay of rotating the phase interpolator by half-cycle/quarter-cycle rotations and to perform an operation of subtracting the first timing difference from the second timing difference to extract DCE/IQM of the multiphase clock signals.

18. The serializer of claim 16, wherein the delay-adjust module is configured to measure a first timing difference between the rising edges of the reference clock and the first/second pattern output and a second timing difference between the rising edges of the reference clock and the first/second pattern output with 2-bit/1-bit shift plus an added delay of rotating the phase interpolator by half-cycle/quarter-cycle rotations and to perform an operation subtracting the first timing difference from the second timing difference to extract DCE/IQM of the multiphase clock signals.

19. The serializer of claim 15, further comprises a control block coupled to the phase interpolator and the multiplexers, and configured to calibrate the multiphase clock signals using DCE/IQM corrections before allowing the multiphase clock signals to be used by the multiplexers.

20. A method for multiphase clock calibration comprising:
- receiving a clock signal to generate multiphase clock signals with adjustable duty cycles and in-phase quadrature control;
- generating a pattern output based on a data signal sampled by the multiphase clock signals;
- measuring timing differences between edges of a reference clock and the pattern output with adjustable delays;
- detecting a phase error between the pattern output and the reference clock; and
- adjusting phases of the multiphase clock signals to correct duty-cycle errors and in-phase-quadrature mismatches by minimizing the phase error.

* * * * *